(12) United States Patent
Talagala et al.

(10) Patent No.: US 6,934,904 B2
(45) Date of Patent: Aug. 23, 2005

(54) DATA INTEGRITY ERROR HANDLING IN A REDUNDANT STORAGE ARRAY

(75) Inventors: Nisha D. Talagala, Fremont, CA (US); Chia Y. Wu, Newark, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 445 days.

(21) Appl. No.: 09/846,374

(22) Filed: Apr. 30, 2001

(65) Prior Publication Data

US 2003/0167439 A1 Sep. 4, 2003

(51) Int. Cl.$^7$ .............................................. G11C 29/00
(52) U.S. Cl. ..................................................... 714/770
(58) Field of Search ........................... 714/2, 6, 11, 20, 714/44, 48, 52, 758, 770

(56) References Cited

U.S. PATENT DOCUMENTS

| | | | |
|---|---|---|---|
| 30,187 A | * 9/1860 | Hong et al. .................... 33/454 |
| 36,846 A | * 11/1862 | Ng et al. ...................... 415/158 |
| 3,037,697 A | * 6/1962 | Kahn .......................... 714/804 |
| 4,630,269 A | * 12/1986 | Gershenson et al. ........ 714/735 |
| 4,888,691 A | * 12/1989 | George et al. ................ 714/15 |
| 4,949,036 A | * 8/1990 | Bezinque et al. ........... 324/212 |
| 5,134,619 A | * 7/1992 | Henson et al. ............... 714/770 |
| 5,469,453 A | * 11/1995 | Glider et al. .................. 714/6 |
| 5,513,192 A | * 4/1996 | Janku et al. ................. 714/804 |
| 5,588,012 A | 12/1996 | Oizumi |
| 5,859,965 A | * 1/1999 | Gittins et al. ................. 714/52 |
| 5,953,352 A | * 9/1999 | Meyer ......................... 714/820 |
| 6,023,780 A | * 2/2000 | Iwatani ........................ 714/770 |
| 6,098,190 A | * 8/2000 | Rust et al. ................... 714/763 |
| 6,324,669 B1 | 11/2001 | Westby |
| 6,327,672 B1 | * 12/2001 | Wilner .......................... 714/6 |
| 6,353,895 B1 | * 3/2002 | Stephenson ................... 714/5 |
| 6,535,994 B1 | 3/2003 | Kedem |
| 6,553,511 B1 | 4/2003 | DeKoning et al. |
| 6,606,629 B1 | 8/2003 | DeKoning et al. |
| 6,651,137 B2 | 11/2003 | Back et al. |
| 6,675,318 B1 | * 1/2004 | Lee ............................... 714/6 |
| 2002/0169995 A1 | 11/2002 | Archibald, Jr. et al. |

FOREIGN PATENT DOCUMENTS

| | | |
|---|---|---|
| EP | 0 466 296 A2 | 3/1991 |
| EP | 0547 844 A2 | 12/1992 |

OTHER PUBLICATIONS

"Quantum Smart System", Quantum.com, S.M.A.R.T. Advanced Drive Diagnostics White Paper, www.quantum.com/src/whitepapers/wp_smart_toc.htm, pp 1–6, printed Jan. 26, 2001.*

"IBM Drive Fitness Test", IBM, pp 1–7, Aug. 1999.*

"Leveraging the Benefits of Ultra160 SCSI Technology", pp 1–6, Nov. 1999.*

(Continued)

*Primary Examiner*—Albert Decady
*Assistant Examiner*—John P. Trimmings
(74) *Attorney, Agent, or Firm*—Meyertons Hood Kivlin Kowert & Goetzel, P.C.; B. Noël Kivlin

(57) ABSTRACT

Data integrity errors in a redundant storage array are handled by storing a plurality of data blocks having a horizontal redundant relationship and storing a plurality of checksums, each checksum having a vertical redundant relationship with a corresponding one of the plurality of data blocks. In response to detection of a data integrity error in at least one of the plurality of data blocks, the vertical redundant relationships between each of the checksums in the plurality of checksums and the corresponding data blocks are reviewed and the horizontal redundant relationship between the data block having the data integrity error and the remaining data blocks in the plurality of data blocks is also reviewed. The results of these reviews of the redundant relationships can be used to diagnose and repair the data integrity error.

56 Claims, 8 Drawing Sheets

OTHER PUBLICATIONS

"Predictive Failure Analysis", IBM Hard Disk Drives/Library/Predictive Failure Analysis, www.storage.ibm.com/oem/tech/pfa.htm, pp 1–4, printed Apr. 24, 2001.*

"Quantum Smart System," Quantum.com, S.M.A.R.T. Advanced Drive Diagnostics White Paper, www.quantum.com/src/whitepapers/wp_smart_toc.htm, pp. 1–6, printed Jan. 26, 2001.

"IBM Drive Fitness Test," IBM, pp. 1–7, Aug. 1999.

"Leveraging the Benefits of Ultra160 SCSI Technology," pp. 1–6, Nov. 1999.

"Predictive Failure Analysis," IBM Hard Disk Drives/Library/Predictive Failure Analysis, www.storage.ibm.com/oem/tech/pfa.htm, pp. 1–4, printed Apr. 24, 2001.

International Application No. PCT/US02/13553, International Search Report, date of mailing Sep. 9, 2003.

* cited by examiner

DATA INTEGRITY ERROR HANDLING IN A REDUNDANT STORAGE ARRAY

FIELD OF THE INVENTION

This invention relates to systems and methods for diagnosing and repairing data integrity errors in arrays of storage devices.

BACKGROUND

Storage systems for storing data in non-volatile form may include a plurality of storage devices, such as magnetic hard disk drives ("disk drives"), arranged in an array such that increased storage capacity and data redundancy may be achieved. Periodically, these storage devices may experience errors of various origin. Disk drives, for example, are subject to a number of possible failures which can compromise data integrity. Certain tracks on a particular disk may be affected by defects in the magnetic recording media. Data errors can be produced by the non-uniform flying height of the read/write head over the magnetic disk. Power outages can also cause spindle-motor or servo-motor seizures. In some cases, the power supply or the controller board for a disk drive can fail completely, or a disk drive can lose functionality while the data is being written to the disk. All of these potential failures pose a threat to the integrity of data or may result in performance degradation, as error recovery systems work to repair or reconstruct lost data.

These types of errors may be "silent" because the drive does not always detect that an error has occurred. If left undetected, such errors may have detrimental consequences such as undetected long term data corruption that is not repairable via backup. All of these potential failures pose a threat to the integrity of data or may result in performance degradation, as error recovery systems work to repair or reconstruct lost data.

In computing systems for large data processing and data storage applications, redundant storage devices are often provided to enhance the integrity of data maintained on the system in the event of a failure of a storage device. For example, RAID ("Redundant Array of Inexpensive Disks") technology utilizes an array of disk drives which can contain data and parity information distributed across each disk drive in the array. The parity information is additional information stored on the disks which can be used to reconstruct data contained on any of the disk drives in the array in the event of a single disk drive failure. In this manner, these RAID disk arrays can improve the data integrity of the storage system by providing for data recovery despite the failure of a disk drive. However, the use of a large number of inexpensive disks in an array can pose reliability issues because the predicted frequency of failure in an array is equal to the predicted failure rate for each disk drive multiplied by the number of disk drives in the array. As the total number of disk drives increases, the frequency of failure in the array increases accordingly.

In addition, conventional RAID systems often do not provide sufficient mechanisms for diagnosing and repairing errors, particularly when the errors are silent or when there are multiple disk drive failures. RAID-style redundancy is typically intended to improve availability by enabling systems to recover from clearly identified failures. For instance, RAID 5 can recover the data on a disk drive when the disk drive is known to have failed (i.e., when the disk drive stops serving requests). The RAID 5 redundancy itself is not used to identify the failure. Therefore, silent errors can exist and propagate without warning.

SUMMARY

In accordance with embodiments of the present invention, a method for operating a storage system is provided. The method comprises storing a plurality of data blocks having a horizontal redundant relationship and storing a plurality of checksums, each checksum having a vertical redundant relationship with a corresponding one of the plurality of data blocks. In response to detection of a data integrity error in at least one of the plurality of data blocks, the vertical redundant relationships between each of the checksums in the plurality of checksums and the corresponding data blocks are reviewed.

In accordance with another embodiment of the present invention, a storage system is provided. The storage system comprises a storage array comprising a plurality of storage devices, a plurality of data blocks having a horizontal redundant relationship, each data block stored on one of the plurality of storage devices, a plurality of checksums, each checksum having a vertical redundant relationship with a corresponding one of the plurality of data blocks, and an array manager coupled to the storage array. The array manager is configured such that in response to detection of a data integrity error in at least one of the plurality of data blocks, the array manager reviews the vertical redundant relationships between each of the checksums in the plurality of checksums and the corresponding data blocks.

In accordance with another embodiment of the present invention, a computer-readable medium is provided. The computer-readable medium contains contents which cause a computer system to operate a storage system by performing the steps of detecting a data integrity error in at least one of a plurality of data block having a horizontal redundant relationship, and analyzing a plurality of checksums, each checksum having a vertical redundant relationship with a corresponding one of the plurality of data blocks, said analyzing comprising reviewing the vertical redundant relationships between each of the checksums in the plurality of checksums and the corresponding data blocks.

In accordance with another embodiment of the present invention, a storage system is provided. The storage system comprises a plurality of storage devices configured to store a plurality of data blocks and a plurality of checksums, wherein each data block in said plurality of data blocks has a first type of redundant relationship with a corresponding one of the plurality of checksums and each data block in said plurality of data blocks has a second type of redundant relationship with the remaining data blocks in said plurality of data blocks. The storage system further comprises an array manager coupled to said plurality of storage devices, wherein said array manager is configured to detect a data integrity error in one of the first type of redundant relationships between the plurality of data blocks and the plurality of checksums and to check for additional data integrity errors in the remaining first type of redundant relationships between the plurality of data blocks and the plurality of checksums.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

While specific embodiments are described and illustrated herein, these embodiments are not intended to limit the scope of the invention, which is susceptible to various modifications and alternative forms. The use of the same reference symbols in different drawings indicates similar or identical items.

DETAILED DESCRIPTION

Figure 1:
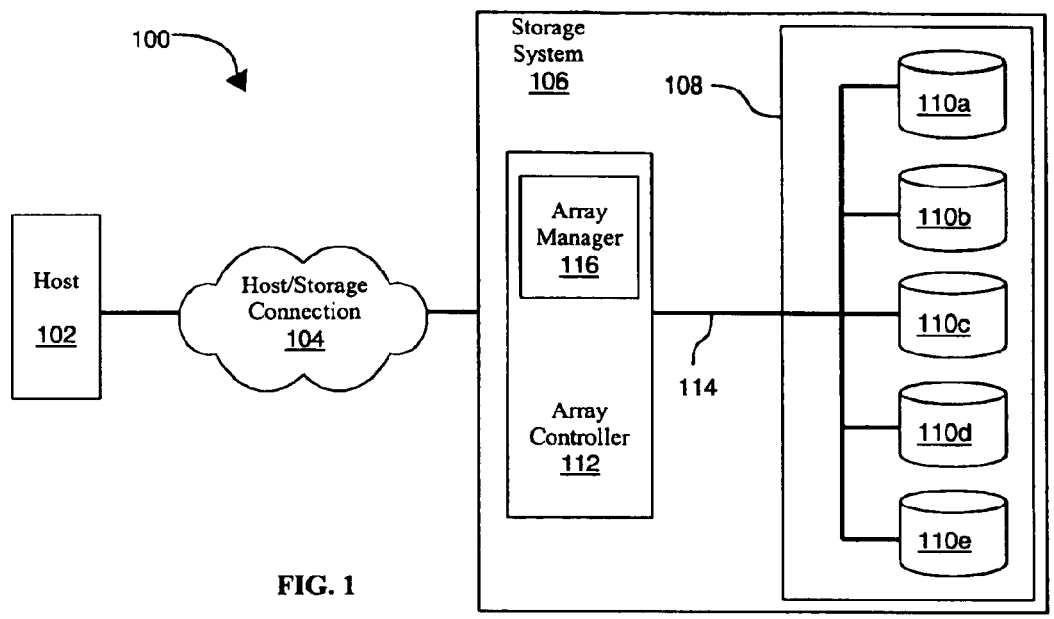
FIG. 1 shows a functional block diagram of a storage system in accordance with embodiments of the present invention.

FIG. 1 shows a functional block diagram of a data processing system 100, which includes a host 102 connected to a storage system 106 via host/storage connection 104. Host/storage connection 104 can be, for example, a local bus, a network connection, an interconnect fabric, or a communication channel. Storage system 106 can be, for example, a RAID storage subsystem, a JBOD ("Just a Bunch of Disks") array, or a tape library. In various embodiments, a plurality of hosts 102 can be in communication with storage system 106 via host/storage connection 104.

For one embodiment of the present invention, storage system 106 is a storage device array 108 which includes a plurality of storage devices 110a–110e. Storage devices 110a–110e can be, for example, magnetic hard disk drives, optical drives, magneto-optical drives, tape drives, solid state storage, or other non-volatile memory. As shown in FIG. 1, storage devices 110 are disk drives and storage device array 108 is a disk drive array. Although FIG. 1 shows a storage device array 108 having five storage devices 110a–110e, it is understood that the number of storage devices 110 in storage device array 108 may vary and is not limiting.

Storage system 106 may also include an array controller 112 connected to each storage device 110 in storage array 108 via data path 114. Data path 114 can provide communication between array controller 112 and storage devices 110 using various communication protocols, such as, for example, SCSI ("Small Computer System Interface"), FC ("Fibre Channel"), FC-AL ("Fibre Channel Arbitrated Loop"), SSA ("Serial Storage Architecture"), IEEE 1394, or IDE/ATA ("Integrated Drive Electronics"/"Advanced Technology Attachment").

Array controller 112 can take many forms, depending on the design for storage system 106. In a JBOD system, array controller 112 may only provide simple I/O connectivity between host 102 and storage devices 110. In other storage systems 106, such as controller-based RAID systems, array controller 112 can also include an array manager 116 to provide volume management, data redundancy, and file management services. In other embodiments of the present invention, the array manager may reside elsewhere in data processing system 100. For example, in software RAID systems, the array manager may reside on host 102 and be implemented as part of a volume management software application. In other embodiments, the array manager may be implemented in firmware which resides in a dedicated controller card on host 102. In yet other embodiments, the array manager may be incorporated as part of the operating system for either the host or the storage system.

Array controller 112 may be implemented in various forms. In some embodiments, array controller 112 may include a plurality of target-specific controllers, each target-specific controller being connected to one or more of the storage devices 110. In yet other embodiments, a plurality of array controllers 112 may be provided in storage system 106 to provide for redundancy and/or performance improvements.

Figure 2:
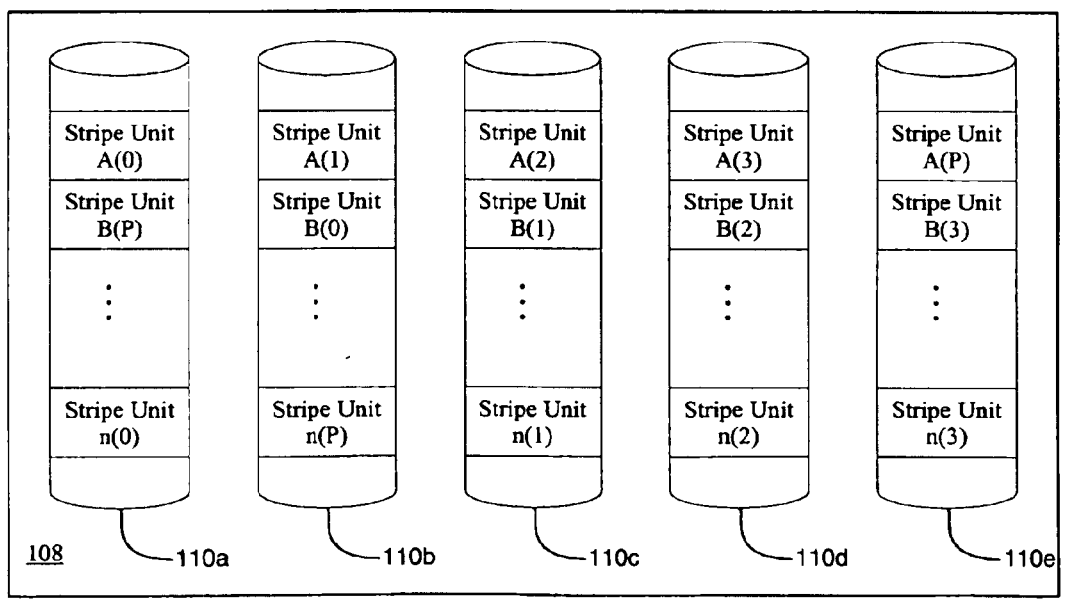
FIG. 2 shows a functional block diagram of an exemplary storage array with RAID striping in accordance with embodiments of the present invention.

FIG. 2 illustrates array 108, including storage devices 110a–110e utilizing a conventional RAID algorithm referred to as RAID 5. RAID 5 implements a striped disk array in which a segment of data is broken down into blocks and each block is written to a separate disk drive. An additional block, referred to as a parity block, is calculated based on the values of the other blocks and is written to a separate disk drive. The parity block and the data blocks are referred to as a parity group or a stripe, and the act of storing a segment of data across multiple disk drives may be referred to as striping.

When storing data to array 108 using a RAID 5 algorithm, a first segment of data to be stored is transmitted from host 102 over host/storage connection 104 to storage system 106. In this embodiment, storage system 106 is a hardware RAID system, so array controller 112 includes an array manager 116 which performs the RAID processing on the data to be stored. Array manager 116 separates the segment of data into four data blocks, shown in FIG. 2 as data stripe units A(0) through A(3), and writes those data blocks onto devices 110a through 110d. A fifth data block stored on device 110e, shown in FIG. 2 as parity stripe unit A(P), is a parity block which is calculated by array manager 116 based on the data in stripe units A(0) through A(3).

Data stripe units A(0)–A(3) and parity stripe unit A(P) together form a parity group. Each of the data blocks in this parity group can be described as having a redundancy relationship with the other data blocks in that if one of the storage devices fails, the remaining storage devices can be used to reconstruct the data from the failed device. For example, in the RAID 5 system of FIG. 2, if device 110b were to fail, parity stripe unit A(P) can be used with the data in devices 110a, 110c, and 110d to restore the data in data stripe unit A(1) on failed drive 110b.

FIG. 2 shows additional parity groups stored on devices 110a–110e. A second segment of data is separated into data stripe units B(0) through B(3) and written onto devices 110b–110e. For this parity group, the parity stripe unit B(P) is stored on device 110a, a different storage device than the one containing parity stripe unit A(P).

In accordance with embodiments of the present invention, checksums may be used in conjunction with another redundancy relationship, such as, for example, the RAID 5 parity described above. These checksums provide secondary redundancy relationships which can be used to help diagnose, identify, and repair data integrity errors in the array 108 of storage devices 110.

The term "checksum" as used herein refers to any segment of data which provides a data integrity check for another segment of data. The checksum may be the result of various computations on the segment of data, and it is not intended to be limited to any one particular methodology. For example, the checksum may take the form of a single parity bit, calculated using an XOR function on the bits in a segment of data. Alternatively, the checksum may be an 8-bit word generated by the binary addition of each of the bytes in an segment of data. In yet another embodiment, the checksum can be a CRC ("cyclic redundancy code") which can be calculated using a 16-bit CRC generator polynomial. The checksum may be the result of any repeatable computation on a segment of data. The function used (i.e., the computation performed on the data) can vary. In some embodiments, the checksum is smaller than the segment of data to which it corresponds. For example, a 4096 byte segment of data may have a 4 byte checksum. In addition, the size of the segment of data can vary. In some cases, the segment of data on which the checksum calculation is performed is the size of the smallest block of data which can be accessed from the disk drive (typically between 512 and 8192 bytes). In other embodiments, the segment of data can be larger or smaller.

Data integrity errors are defined as any discrepancy between the incoming data which was sent (or written) to storage system 106 for storage in storage device 110 and the result (outgoing data) which is retrieved when that data is requested back from storage system 106. When storage system 106 is operating properly, the incoming data should match the outgoing data. However, various failures, examples of which are described above, can introduce errors into the retrieved data.

Figure 3A:
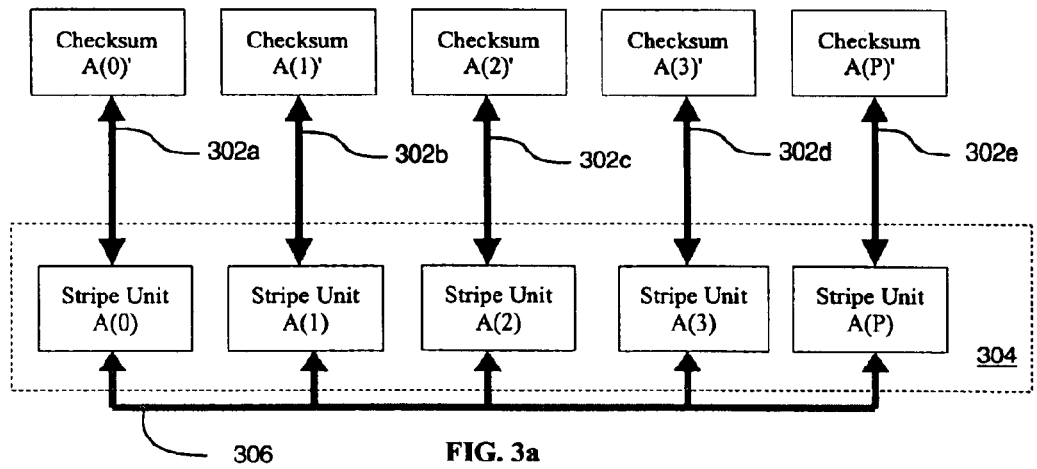
FIGS. 3a–3d show functional block diagrams of vertical and horizontal redundant relationships in accordance with various embodiments of the present invention.

FIG. 3a illustrates a functional block diagram of vertical and horizontal redundant relationships in accordance with embodiments of the present invention. As used herein, the terms "redundant relationship" and "redundancy relationship" refer to any association between multiple segments of data which provides redundancy, error correction, and/or error detection capability. For example, one type of redundant relationship is one in which a first segment of data is mirrored in a second identical segment of data. Another type of redundant relationship is the parity redundancy provided in a RAID 5 stripe. Other types of redundant relationships include the various checksum embodiments described above. These checksum embodiments may not provide the complete redundancy existing in the mirrored segments of data above, but can provide some level of redundancy or error detection capability between the data block and its corresponding checksum.

The terms "horizontal" and "vertical" as used herein are shorthand terms referring to conceptual relationships between the various data segments and are not intended to be limited to any particular spatial relationships between physical bits forming the stripe units and their checksums. In FIG. 3a, the five data blocks (data stripe units A(0)–A(3) and parity stripe unit A(P)) collectively form a parity group 304 having a horizontal redundant relationship 306. This horizontal redundant relationship exists because if any one of the data blocks in parity group 304 is corrupted, the remaining data blocks contain sufficient redundant data to reconstruct the corrupted data block.

The nature of conventional RAID 5 parity groups is such that although the redundant relationship in the parity group can be analyzed to determine whether a data integrity error exists within the parity group, it is generally not possible to identify which data block in that parity group contains the data integrity error. Therefore, when one of the drives in a RAID 5 array fails completely, the RAID 5 striping enables the storage system to reconstruct the data on that drive. However, if a silent error occurs in one of the drives, conventional I/O requests to a RAID 5 array do not provide any indication that an error has occurred. The RAID 5 striping can be used to indicate that a data integrity error exists somewhere in the stripe, but cannot identify which drive contains the error. Accordingly, reconstructing the data is not possible if it is not already known which drive contains the error.

The term "vertical redundant relationship" refers to a redundant relationship between a data block and a checksum corresponding to that data block. FIG. 3a shows five different vertical redundant relationships 302a–302e existing between checksums A(0)'–A(P)' and stripe units A(0)–A(P), respectively. In contrast with the horizontal redundancy relationship 306, which exists between five data blocks A(0)-A(P), each vertical redundant relationship 302a–302e exists between two segments of data, a checksum and a data block.

RAID 5 arrays are typically represented in symbolic diagrams as a plurality of cylinders arranged in a horizontal line, wherein each of the stripe units in a parity stripe is arranged in the diagram such that the parity stripe forms a horizontal line. Just as it is understood by those of ordinary skill in the art that the symbolic diagrams of RAID arrays do not necessarily represent the actual physical locations of the disk drives and the parity stripes, it will also be understood that the terms "horizontal redundancy" and "horizontal redundant relationship" do not necessarily represent a spatial orientation of the bits forming the data blocks. Similarly, the terms "vertical redundancy" and "vertical redundant relationship" do not suggest a spatial orientation of the checksum and its corresponding segment of data. Instead, this "vertical redundancy" represents a redundant relationship separate from the horizontal redundant relationship.

Figure 4A:
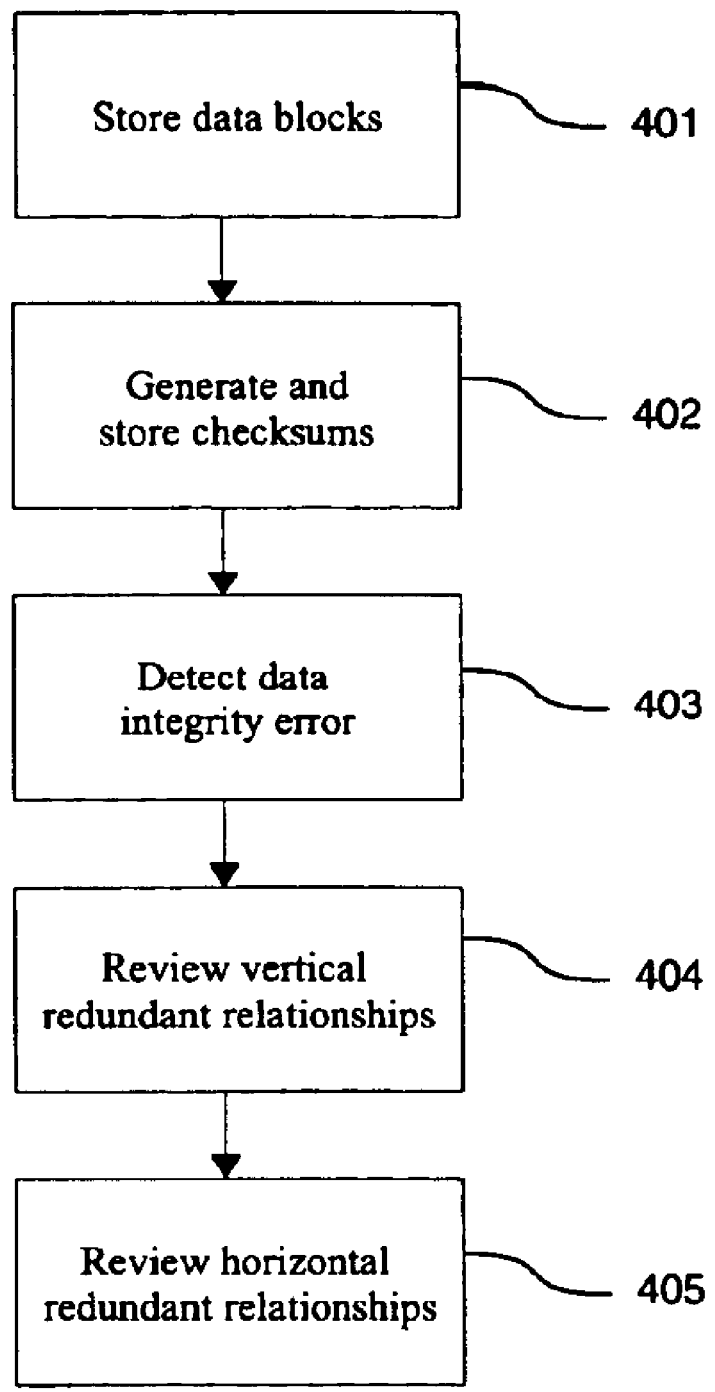
FIGS. 4a–4e illustrate a data integrity error diagnosis and repair process in accordance with embodiments of the present invention.

FIG. 4a is a flowchart illustrating a process for handling data integrity errors in accordance with embodiments of the present invention. In step 401, a plurality of data blocks are stored having a horizontal redundant relationship. In one embodiment, host 102 sends a first segment of data to storage system 106 for storage. Array manager 116 in array controller 112 uses a RAID 5 methodology to divide the segment of data from host 102 into four data blocks, and uses those four data blocks to compute a parity data block. These five data blocks are stored in disk drives 110a–110e as data stripe units A(0)–A(3) and parity stripe unit A(P), as shown in FIG. 3a. Because these data blocks form a parity group, they have a horizontal redundancy relationship 306.

In step 402, array manager 116 generates five checksums A(0)'–A(P)', each checksum having a vertical redundant relationship 302a–302e with one of the five stripe units A(0)–A(P), respectively. Checksums A(0)'–A(P)' can be generated according to the various methodologies described above and can be stored in a variety of locations, including, for example, in host 102, in a checksum memory provided in array controller 112, in array 108, or in a storage device separate from array 108. In one example, checksums A(0) '–A(P)' are appended to their corresponding stripe unit A(0)–A(P) and stored with the stripe units A(0)–A(P) on disk drives 110a–110e. In another example, all of the checksums for array 108 are stored on a separate, dedicated checksum disk drive in storage system 106.

In step 403, a data integrity error is detected in a first vertical redundant relationship. This data integrity error can be detected using various methods. In one embodiment, each time host 102 requests a data block from array 108, the checksum corresponding to that requested data block is also retrieved and compared to the data block. This comparison may be performed by calculating a new checksum for that data block and comparing that calculated new checksum to the original checksum. A data integrity error is detected if there is a mismatch between the calculated checksum and the original checksum. In other embodiments, the checksums for all of the blocks of data on a disk drive are reviewed periodically to search for data integrity errors. This periodic review can occur, for example, on a daily, weekly, or monthly basis in order to search for data integrity errors in data blocks which are infrequently accessed by host 102.

The detection of a single data integrity error in one of the vertical redundant relationships can indicate that either the data block and/or its corresponding checksum contains an error. The process described herein with respect to FIGS. 4a–4e can provide a diagnosis and possible repair methodology for the error.

After the data integrity error in one of the vertical redundant relationships is detected, all of the other vertical redundant relationships in that parity group are reviewed in step 404. For example, if a data integrity error is detected in the vertical redundant relationship between checksum A(0)' and stripe unit A(0), the checksums A(1)', A(2)', A(3)', and A(P)' are then checked against the data in stripe units A(1), A(2), A(3), and A(P), respectively.

Figure 4B:
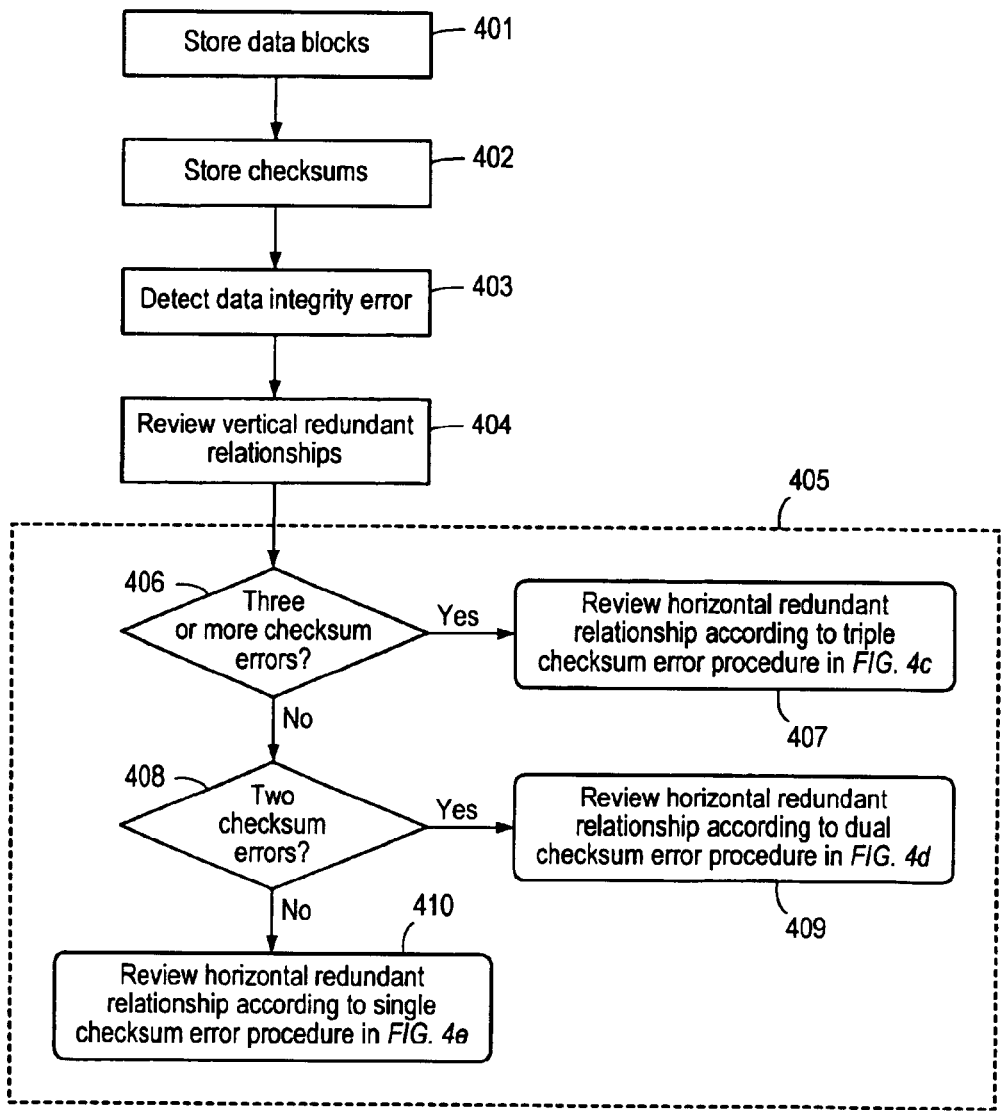

In step 405, the horizontal redundant relationship between stripe units A(1), A(2), A(3), and A(P) are reviewed. FIG. 4b shows an exemplary process for reviewing this horizontal redundant relationship. In step 406, if a total of three or more data integrity errors in the vertical redundant relationships are identified for that parity group, then the process proceeds to step 407. In step 407, the horizontal redundant relationship between stripe units A(0)–A(P) is reviewed according to the triple checksum error procedure illustrated in FIG. 4c. If exactly two data integrity errors are identified in step 408, then the process proceeds to step 409 in which the horizontal redundant relationship is reviewed according to the double checksum error procedure in FIG. 4d. Finally, if the only data integrity error identified is the checksum error detected in step 403, then the process proceeds to step 410, in which the horizontal redundant relationship is reviewed according to the single checksum error procedure in FIG. 4e.

Figure 4C:
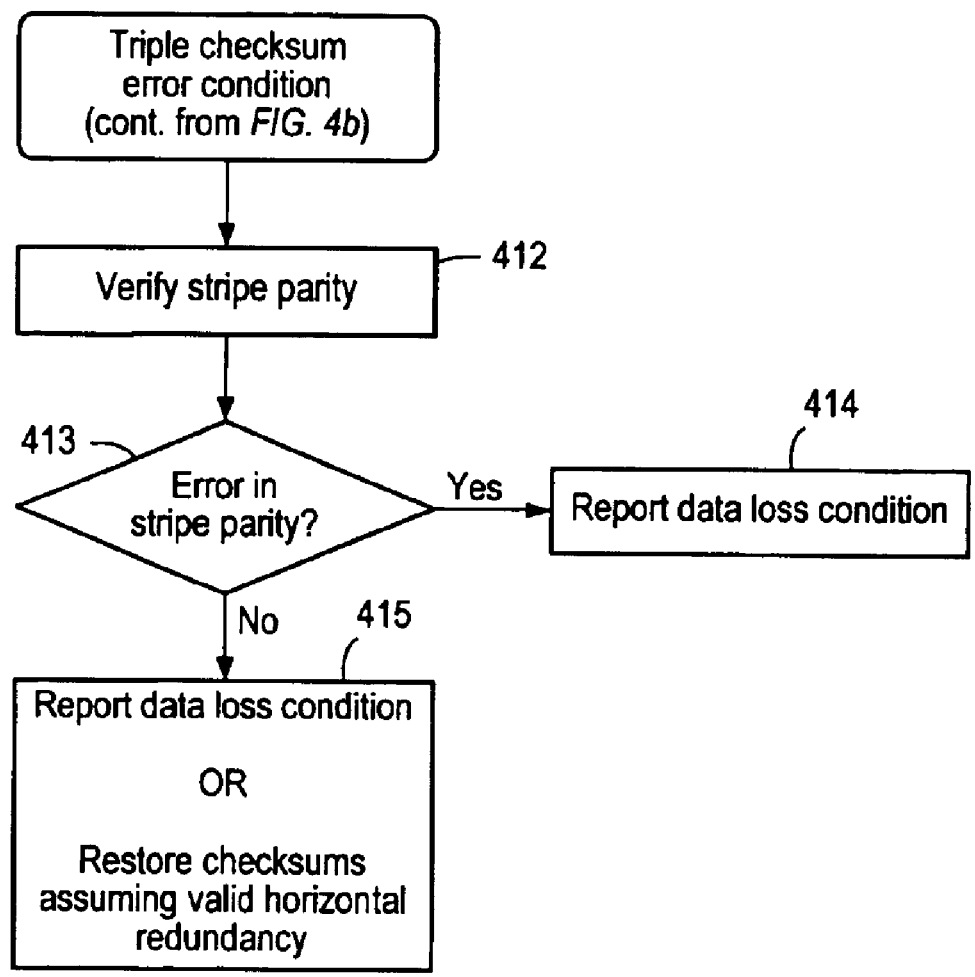

A storage system having three or more data integrity errors in its vertical redundant relationships suggests that a serious error may exist from which any data recovery may be unreliable. Therefore, in some embodiments, such as those in which data integrity is of utmost importance, it may be desirable to report a data loss condition in the event any three or more checksums contain data integrity errors. In other embodiments, it may be desirable to attempt to recover from a triple checksum error condition if a sufficient degree of reliability can be achieved. FIG. 4c illustrates one methodology which may be used in the triple error case. In step 412, the horizontal redundant relationship for the data blocks is reviewed. In embodiments where the horizontal redundant relationship comprises a RAID 5 parity group, this review is performed by performing a stripe integrity test in which the stripe parity for stripe units A(0)–A(P) is verified. This verification can be performed, for example, by calculating a new parity stripe unit based on the four data stripe units A(0)–A(3), and then comparing the new parity stripe unit to the existing parity stripe unit A(P). A horizontal redundancy data integrity error is identified in step 413 if the new parity stripe unit does not match with the existing stripe unit A(P).

In step 414, if there are three or more checksum errors and there is an error in the stripe parity, array manager 116 will report a data loss condition. In other words, when three or more data integrity errors are identified in the vertical redundancy relationships and a data integrity error is identified in the horizontal redundancy relationship, it can be concluded that the data stored in parity group 304 cannot be reliably recovered.

If the stripe parity does not contain a data integrity error, it may be reasonable to rely upon the stripe parity and assume that the data stored in stripe units A(0)–A(3) remains valid and that all of the detected data integrity errors reflect data corruption in the checksums, not the stripe units. Therefore, in step 415, new checksums are created based on the existing data in stripe units A(0)–A(3) to replace all of the original checksums which do not match with their corresponding stripe units.

Figure 4D:
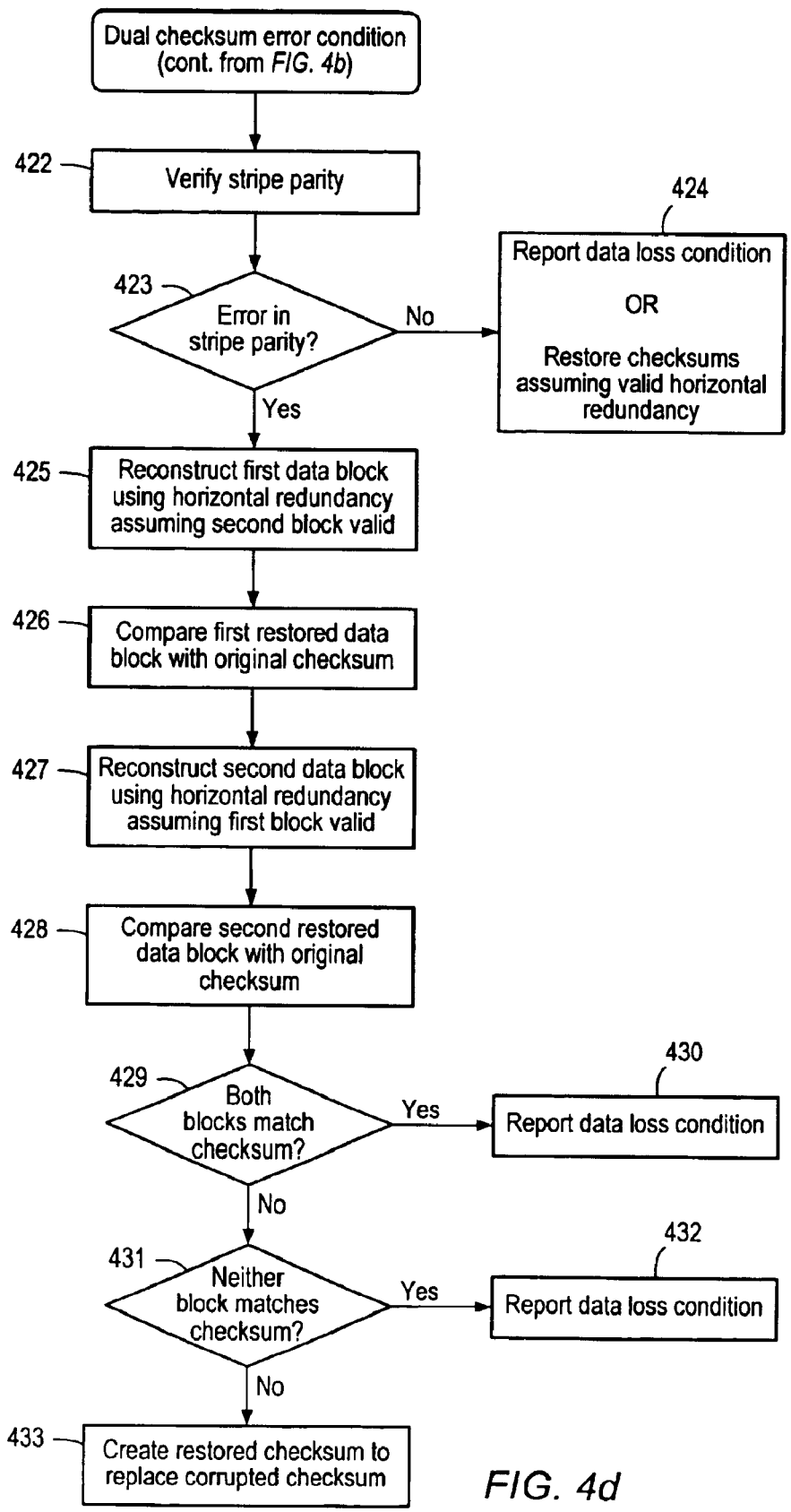

FIG. 4d illustrates a methodology for coping with a dual checksum error condition. In step 422, the horizontal redundant relationship for the data blocks is reviewed by, for example, verifying the stripe parity as described above with respect to step 412 in FIG. 4c. If no data integrity error in the horizontal redundant relationship is detected in step 423 (i.e., the parity group passes the stripe integrity test), then a data loss condition is reported in step 424. The data loss condition is reported because it may not be reliably determined whether the two checksum errors indicate that both checksums have been corrupted or that both of the stripe units have been corrupted. In other embodiments, it may be reasonable to assume that because the parity group has passed the stripe integrity test, the data blocks are valid and that the checksums were corrupted. Therefore, the checksums may be reconstructed based on the original data blocks.

If there are two vertical redundancy relationship data integrity errors and the parity stripe fails the stripe integrity test, then steps 425–433 can be used to further diagnose the data integrity errors. The error handling methodology described in steps 425–433 reconstructs each problematic stripe unit in turn, assuming that the other problematic stripe unit contains uncorrupted data. Once a stripe unit is reconstructed, it is compared against its checksum. A corrupted stripe unit, when reconstructed, will match its checksum, while an uncorrupted stripe unit, when recomputed using the corrupted stripe unit, will contain an incorrect value that will not match its checksum.

Figure 3B:
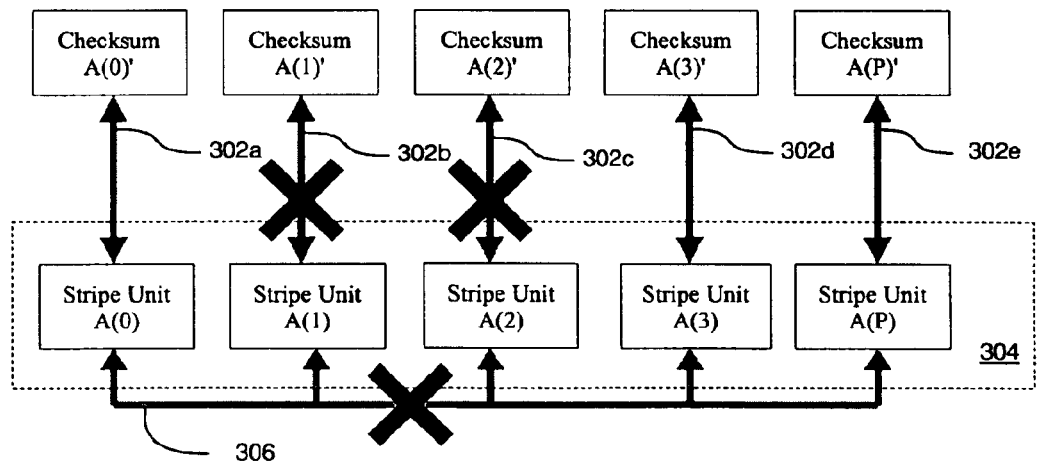

This methodology will be described with reference to FIG. 3b, which shows a parity group 304 wherein the vertical redundancy relationships 302b and 302c and the horizontal redundancy relationship 306 contain data integrity errors. First, array manager 116 assumes that stripe unit A(1) contains corrupted data and that stripe unit A(2) contains valid data, and utilizes the horizontal redundant relationship 306 to restore stripe unit A(1). In other words, in step 425, a restored stripe unit A(1) is created using the parity data from parity stripe unit A(P) and assuming that stripe units A(0), A(2), and A(3) contain valid data. In step 426, this restored stripe unit A(1) is then compared to the original checksum A(1)'.

Next, array manager 116 switches the assumption and assumes that stripe unit A(2) contains corrupted data and that the original stripe unit A(1) contains valid data. In step 427, a restored stripe unit A(2) is created using the parity data from parity stripe unit A(P) and assuming that original stripe units A(0), A(1), and A(3) contain valid data. In step 428, this restored stripe unit A(2) is then compared to the original checksum A(2)'.

Analyzing the results of these two assumptions can help diagnose the data integrity errors. In step 429, if there is a mismatch between the restored stripe unit A(1) and the original checksum A(1)' and a mismatch between the restored stripe unit A(2) and the original checksum A(2)', it can be determined that neither assumption was correct and a data loss condition is reported in step 430. Similarly, if there is a match between the restored stripe unit A(1) and the original checksum A(1)' and a match between the restored stripe unit A(2) and the original checksum A(2)', it can again be determined that neither assumption was correct. Accordingly, a data loss condition is reported in step 432.

If the first restored stripe unit A(1) matches with the original checksum A(1)' and the second restored stripe unit A(2) does not match with its original checksum A(2)', then it can be concluded that the original stripe unit A(2) contained valid data and that the original stripe unit A(1) did not. Accordingly, it is concluded that original checksum A(1)' contained valid data and original checksum A(2)' contained corrupted data. Therefore, in step 433, a restored checksum A(2)' is created based on the original stripe unit A(2), and the original stripe unit A(1) is replaced with the restored stripe unit A(1).

Figure 4E:
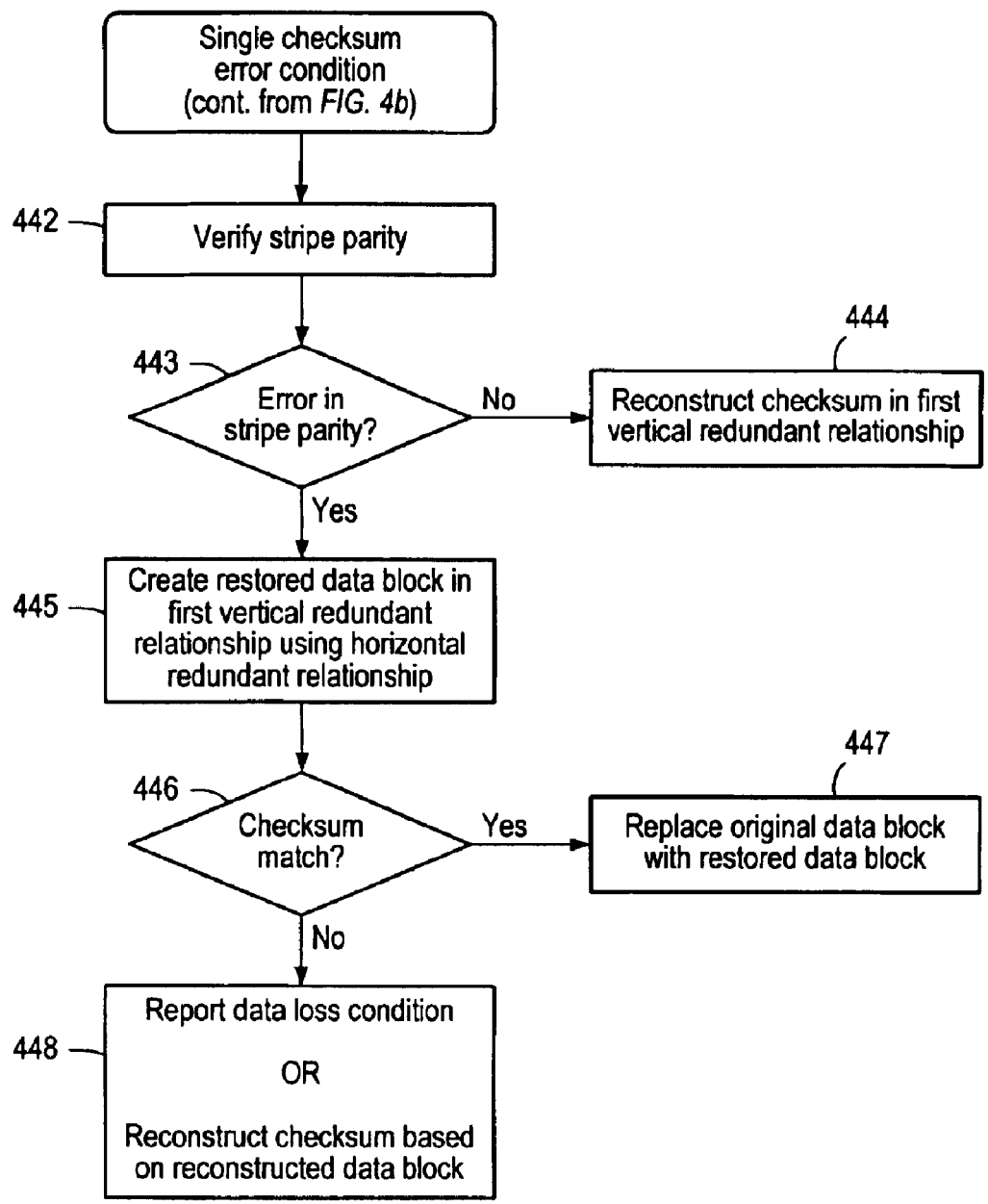

FIG. 4e illustrates the methodology used when a single checksum error condition is identified. In this situation, either or both the stripe unit and its corresponding checksum are corrupted. In step 442, a stripe parity integrity test is performed to determine whether a data integrity error exists in the horizontal redundancy relationship 306. If there is no error in the stripe parity, it is concluded that the stripe unit contains valid data and its checksum is restored in step 444.

If there is a data integrity error in the horizontal redundancy relationship, then the other stripe units in the parity group are used to create a restored stripe unit in step 445. This restored stripe unit is then compared the original checksum in step 446. If there is a match between the restored stripe unit and the original checksum, it is concluded that the original stripe unit contained invalid data and the original stripe unit is replaced with the restored stripe unit in step 447.

If there is a mismatch between the restored stripe unit and the original checksum, various conclusions may be drawn. In some embodiments, detection of this dual error condition is reported and the data is assumed to have been lost. In other embodiments, it can be assumed that the parity group provides sufficient redundancy that this horizontal redundancy relationship can be reasonably relied upon to reconstruct the stripe unit, even when there is a mismatch with the checksum. Therefore, in step 448, a new checksum is created based on the newly reconstructed stripe unit.

Figure 3C:
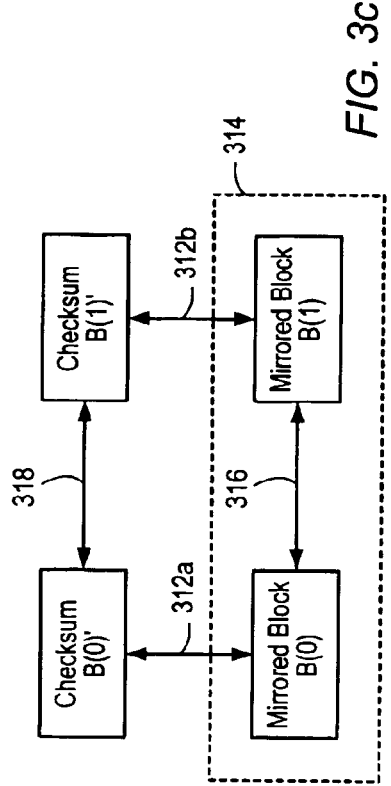

Much of the discussion above related to systems in which the horizontal redundant relationship is a RAID 5 parity stripe. In various embodiments, other forms of horizontal redundant relationships may be used. FIG. 3c shows mirrored data blocks B(0) and B(1), which form mirrored pair 314 having a horizontal redundant relationship 316. Here, the horizontal redundant relationship 316 is established by mirroring the data stored in data block B(0) into data block B(1). If either block B(0) or B(1) were to fail, the remaining block could be used to restore the failed data block. This mirrored horizontal redundant relationship is sometimes referred to as RAID 1.

In accordance with embodiments of the present invention, a first vertical redundant relationship 312a exists between checksum B(0)' and mirrored block B(0), and a second vertical redundant relationship 312b exists between checksum B(1)' and mirrored block B(1). Because mirrored blocks B(0) and B(1) contain identical data, checksums B(0)' and B(1)' contain identical checksum data, thereby establishing a second horizontal redundant relationship 318.

A data integrity error diagnosis and repair methodology for the RAID 1 system shown in FIG. 3c can be performed according to process described above with respect to FIG. 4b. Steps 401–404 can be performed as described above, but because there are only two data blocks (mirrored block B(0) and mirrored block B(1)), it is not possible to detect three or more checksum errors in step 406. Therefore, the process proceeds to step 408.

If both checksums B(0)' and B(1)' do not match with their corresponding data blocks B(0) and B(1), then a dual checksum error condition is identified and the process shown in FIG. 4d is performed. If only one of the checksums does not match with its corresponding data block, then a single error condition is identified and the process shown in FIG. 4e is performed. However, in FIGS. 4d and 4e, instead of performing the parity test of RAID 5 systems, the two mirrored data blocks B(0) and B(1) are directly compared to each other. When the two data blocks do not match, a horizontal redundancy relationship error is detected. If the two data blocks match, then no data integrity errors in the horizontal redundancy relationship are identified.

Figure 3D:
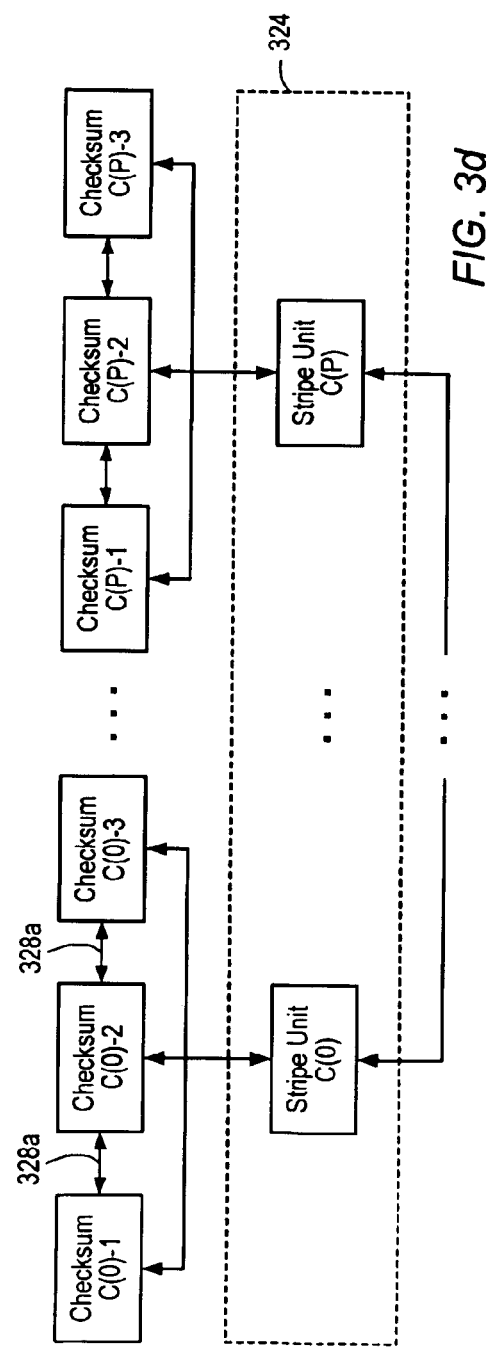

In alternative embodiments, the vertical redundant relationships may also be established in different ways. For example, multiple checksums may be provided for each data block. FIG. 3d shows a parity group 324 similar to parity group 304 in FIG. 3a. Parity group 324 contains five data blocks comprising stripe unit C(0) through C(3) and parity stripe unit C(P). (Stripe units C(1), C(2), and C(3) are omitted from FIG. 3c for clarity.) Each data block in parity group 324 has three checksum blocks associated with it. These checksum blocks can all be created using the same checksum algorithm, thereby creating three identical checksums for each data block. Alternatively, each checksum block can be created using a different algorithm.

Stripe unit C(0) has a set of three identical checksums C(0)-1, C(0)-2, and C(0)-3 associated with it. Because these checksums C(0)-1, C(0)-2, and C(0)-3 are created from the same stripe unit C(0), they should contain the same data and therefore a horizontal redundant relationship 328a exists between checksums C(0)-1, C(0)-2, and C(0)-3.

The use of multiple checksums with each data block provides an additional process for handling data integrity errors. In one embodiment, when a first checksum mismatches its corresponding data block, the other checksums in that set are compared to the data block. If all of the other checksums match with the data block, then the data block is assumed to be valid and the first checksum is reconstructed. If more than one of the other checksums does not match with the data block, the methodology shown in FIGS. 4a–4e can then be used to diagnose and repair the error.

While the invention has been described in terms of particular embodiments and illustrative figures, those of ordinary skill in the art will recognize that the invention is not limited to the embodiments or figures described. In particular, the methodologies described above can be practiced in alternative embodiments in which the order of the operations are varied. In addition, the horizontal redundancy relationship need not be limited to a RAID 1 or RAID 5 redundancy; various forms of data integrity processes can be used. Therefore, it should be understood that the invention can be practiced with modification and alteration within the spirit and scope of the appended claims. The description is thus to be regarded as illustrative instead of limiting on the invention.

What is claimed is:

1. A method of operating a storage system, comprising:
   storing a plurality of data blocks having a horizontal redundant relationship;
   storing a plurality of checksums, each checksum having a vertical redundant relationship with a corresponding one of the plurality of data blocks;

in response to detection of a data integrity error in at least one vertical redundant relationship of the plurality of data blocks, determining whether the vertical redundant relationship between each of the remaining data blocks and the corresponding checksums indicates an error; and determining whether the horizontal redundant relationship between the plurality of data blocks indicates an error.

2. The method of claim 1, wherein:

said determining whether the vertical redundant relationship between each of the remaining data blocks and the corresponding checksums indicates an error comprises calculating a new checksum for each of the remaining data blocks in the plurality of data blocks and comparing the calculated new checksum to the checksum from the plurality of checksums corresponding to that data block.

3. The method of claim 1, wherein:

said storing the plurality of checksums comprises storing the plurality of checksums such that each data block in the plurality of data blocks has a vertical redundant relationship with a set of corresponding checksums, and each of the checksums in the set of corresponding checksums has a horizontal checksum redundant relationship with the other checksums in the set of corresponding checksums.

4. The method of claim 3, further comprising:

in response to detecting a first data integrity error between a first data block and a first checksum from a first set of checksums corresponding to the first data block, reviewing the vertical redundant relationship between the first data block and the remaining checksums in the first set of checksums; and in response to detecting no data integrity errors between the first data block and the remaining checksums in the first set of checksums, creating a restored first checksum to replace the first checksum corresponding to the first data integrity error.

5. The method of claim 1, wherein:

said plurality of data blocks comprises a plurality of data stripe units and a parity stripe unit; and said determining whether the horizontal redundant relationship between the plurality of data blocks indicates an error comprises calculating a new parity stripe unit based on the plurality of data stripe units and comparing the calculated new parity stripe unit to the parity stripe unit from the plurality of data blocks.

6. The method of claim 1, wherein:

said plurality of data blocks comprises a first mirrored data block and a corresponding second mirrored data block; and said determining whether the horizontal redundant relationship between the plurality of data blocks indicates an error comprises comparing the first mirrored data block and the second mirrored data block.

7. The method of claim 1, further comprising:

in response to detecting a first data integrity error in exactly one of the vertical redundant relationships and detecting no data integrity errors in the horizontal redundant relationship, creating a restored checksum using the data block corresponding to the first data integrity error to replace the existing checksum corresponding to the first data integrity error.

8. The method of claim 1, further comprising:

in response to detecting a first data integrity error in exactly one of the vertical redundant relationships and detecting a second data integrity error in the horizontal redundant relationship, creating a restored data block using the horizontal redundant relationship to replace the data block corresponding to the first data integrity error and comparing the restored data block to the checksum corresponding to the first data integrity error.

9. The method of claim 8, further comprising:

in response to a mismatch between the restored data block and the checksum corresponding to the first data integrity error, creating a restored checksum using the restored data block to replace the checksum corresponding to the first data integrity error.

10. The method of claim 1, further comprising:

in response to detecting a first data integrity error in a first vertical redundant relationship, detecting a second data integrity error in a second vertical redundant relationship, and detecting no data integrity errors in the horizontal redundant relationship, reporting a data loss condition.

11. The method of claim 1, further comprising:

in response to detecting a first data integrity error in a first vertical redundant relationship, detecting a second data integrity error in a second vertical redundant relationship, and detecting a third data integrity error in the horizontal redundant relationship:

creating a first restored data block using the horizontal redundant relationship to replace the data block corresponding to the first vertical redundant relationship;

comparing the first restored data block to the checksum corresponding to the first vertical redundant relationship;

creating a second restored data block using the horizontal redundant relationship to replace the data block corresponding to the second vertical redundant relationship; and comparing the second restored data block to the checksum corresponding to the second vertical redundant relationship.

12. The method of claim 11, further comprising:

reporting a data loss condition in response to either:
(a) a mismatch between the first restored data block and the checksum corresponding to the first vertical redundant relationship and a mismatch between the second restored data block and the checksum corresponding to the second vertical redundant relationship; or
(b) a match between the first restored data block and the checksum corresponding to the first vertical redundant relationship and a match between the second restored data block and the checksum corresponding to the second vertical redundant relationship.

13. The method of claim 11, further comprising:

in response to a match between the first restored data block and the checksum corresponding to the first vertical redundant relationship and a mismatch between the second restored data block and the checksum corresponding to the second vertical redundant relationship, creating a restored checksum using the second restored data block to replace the checksum corresponding to the second vertical redundant relationship.

14. The method of claim 1, further comprising:
in response to detecting data integrity errors in at least three of the vertical redundant relationships, reporting a data loss.

15. A storage system, comprising:
a storage array comprising a plurality of storage devices;
a plurality of data blocks having a horizontal redundant relationship, each data block stored on one of the plurality of storage devices;
a plurality of checksums, each checksum having a vertical redundant relationship with a corresponding one of the plurality of data blocks; and
an array manager coupled to the storage array, wherein said array manager is configured such that in response to detection of a data integrity error in at least one vertical redundant relationship of the plurality of data blocks, said array manager determines whether the vertical redundant relationship between each of the remaining data blocks and the corresponding checksums indicates an error;
wherein the array manager further determines whether the horizontal redundant relationship between the plurality of data blocks indicates an error.

16. The storage system of claim 15, wherein:
said array manager is configured to determine whether the vertical redundant relationship between each of the remaining data blocks and the corresponding checksums indicates an error by calculating a new checksum for each of the remaining data blocks in the plurality of data blocks and comparing the calculated new checksum to the checksum from the plurality of checksums corresponding to that data block.

17. The storage system of claim 15, wherein:
each data block in the plurality of data blocks has a vertical redundant relationship with a set of corresponding checksums, and each of the checksums in the set of corresponding checksums has a horizontal checksum redundant relationship with the other checksums in the set of corresponding checksums.

18. The storage system of claim 17, wherein:
said array manager is configured such that in response to detecting a first data integrity error between a first data block and a first checksum from a first set of checksums corresponding to the first data block, said array manager reviews the vertical redundant relationship between the first data block and the remaining checksums in the first set of checksums; and
said array manager is further configured such that in response to detecting no data integrity errors between the first data block and the remaining checksums in the first set of checksums, said array manager creates a restored first checksum to replace the first checksum corresponding to the first data integrity error.

19. The storage system of claim 15, wherein:
said plurality of data blocks comprises a plurality of data stripe units and a parity stripe unit; and
said array manager is configured to determine whether the horizontal redundant relationship between the plurality of data blocks indicates an error by calculating a new parity stripe unit based on the plurality of data stripe units and comparing the calculated new parity stripe unit to the parity stripe unit from the plurality of data blocks.

20. The storage system of claim 15, wherein:
said plurality of data blocks comprises a first mirrored data block and a corresponding second mirrored data block; and
said array manager is configured to determine whether the horizontal redundant relationship between the plurality of data blocks indicates an error by comparing the first mirrored data block and the second mirrored data block.

21. The storage system of claim 15, wherein:
said array manager is configured such that in response to detecting a first data integrity error in exactly one of the vertical redundant relationships and detecting no data integrity errors in the horizontal redundant relationship, said array manager creates a restored checksum using the data block corresponding to the first data integrity error to replace the existing checksum corresponding to the first data integrity error.

22. The storage system of claim 15, wherein:
said array manager is configured such that in response to detecting a first data integrity error in exactly one of the vertical redundant relationships and detecting a second data integrity error in the horizontal redundant relationship, said array manager creates a restored data block using the horizontal redundant relationship to replace the data block corresponding to the first data integrity error and compares the restored data block to the checksum corresponding to the first data integrity error.

23. The storage system of claim 22, wherein:
said array manager is configured such that in response to a mismatch between the restored data block and the checksum corresponding to the first data integrity error, said array manager creates a restored checksum using the restored data block to replace the checksum corresponding to the first data integrity error.

24. The storage system of claim 15, further comprising:
said array manager is configured such that in response to detecting a first data integrity error in a first vertical redundant relationship, detecting a second data integrity error in a second vertical redundant relationship, and detecting no data integrity errors in the horizontal redundant relationship, said array manager reports a data loss condition.

25. The storage system of claim 15, wherein:
said array manager is configured such that in response to detecting a first data integrity error in a first vertical redundant relationship, detecting a second data integrity error in a second vertical redundant relationship, and detecting a third data integrity error in the horizontal redundant relationship, said array manager:
creates a first restored data block using the horizontal redundant relationship to replace the data block corresponding to the first vertical redundant relationship;
compares the first restored data block to the checksum corresponding to the first vertical redundant relationship;
creates a second restored data block using the horizontal redundant relationship to replace the data block corresponding to the second vertical redundant relationship; and
compares the second restored data block to the checksum corresponding to the second vertical redundant relationship.

26. The storage system of claim 25, wherein:
said array manager is configured such that said array manager reports a data loss condition in response to either:
(a) a mismatch between the first restored data block and the checksum corresponding to the first vertical redundant relationship and a mismatch between the second restored data block and the checksum corresponding to the second vertical redundant relationship; or (b) a match between the first restored data block and the checksum corresponding to the first vertical redundant relationship and a match between the second restored data block and the checksum corresponding to the second vertical redundant relationship.

27. The storage system of claim 25, wherein:

said array manager is configured such that in response to a match between the first restored data block and the checksum corresponding to the first vertical redundant relationship and a mismatch between the second restored data block and the checksum corresponding to the second vertical redundant relationship, said array manager creates a restored checksum using the second restored data block to replace the checksum corresponding to the second vertical redundant relationship.

28. The storage system of claim 15, wherein:

said array manager is configured to report a data loss condition in response to detecting data integrity errors in at least three of the vertical redundant relationships.

29. A computer-readable medium whose contents cause a computer system to operate a storage system by performing the steps of:

detecting an indication of a data integrity error in at least one of a plurality of data blocks having a vertical redundant relationship;

analyzing a plurality of checksums, each checksum having a vertical redundant relationship with a corresponding one of the plurality of data blocks, said analyzing comprising determining whether the vertical redundant relationship between each of the remaining data blocks and the corresponding checksums indicates an error; and determining whether the horizontal redundant relationship between the plurality of data blocks indicates an error.

30. The computer-readable medium of claim 29, wherein:

said determining whether the vertical redundant relationship between each of the remaining data blocks and the corresponding checksums indicates an error comprises calculating a new checksum for each of the remaining data blocks in the plurality of data blocks and comparing the calculated new checksum to the checksum from the plurality of checksums corresponding to that data block.

31. The computer-readable medium of claim 29, wherein:

each data block in the plurality of data blocks has a vertical redundant relationship with a set of corresponding checksums, and each of the checksums in the set of corresponding checksums has a horizontal checksum redundant relationship with the other checksums in the set of corresponding checksums.

32. The computer-readable medium of claim 31, wherein the contents of the computer-readable medium cause the computer system to operate the storage system by performing the further steps of:

in response to detecting a first data integrity error between a first data block and a first checksum from a first set of checksums corresponding to the first data block, reviewing the vertical redundant relationship between the first data block and the remaining checksums in the first set of checksums; and in response to detecting no data integrity errors between the first data block and the remaining checksums in the first set of checksums, creating a restored first checksum to replace the first checksum corresponding to the first data integrity error.

33. The computer-readable medium of claim 29, wherein:

said plurality of data blocks comprises a plurality of data stripe units and a parity stripe unit; and said determining whether the horizontal redundant relationship between the plurality of data blocks indicates an error comprises calculating a new parity stripe unit based on the plurality of data stripe units and comparing the calculated new parity stripe unit to the parity stripe unit from the plurality of data blocks.

34. The computer-readable medium of claim 29, wherein:

said plurality of data blocks comprises a first mirrored data block and a corresponding second mirrored data block; and said determining whether the horizontal redundant relationship between the plurality of data blocks indicates an error comprises comparing the first mirrored data block and the second mirrored data block.

35. The computer-readable medium of claim 29, wherein the contents of the computer-readable medium cause the computer system to operate the storage system by performing the further steps of:

in response to detecting a first data integrity error in exactly one of the vertical redundant relationships and detecting no data integrity errors in the horizontal redundant relationship, creating a restored checksum using the data block corresponding to the first data integrity error to replace the existing checksum corresponding to the first data integrity error.

36. The computer-readable medium of claim 29, wherein the contents of the computer-readable medium cause the computer system to operate the storage system by performing the further steps of:

in response to detecting a first data integrity error in exactly one of the vertical redundant relationships and, detecting a second data integrity error in the horizontal redundant relationship, creating a restored data block using the horizontal redundant relationship to replace the data block corresponding to the first data integrity error and comparing the restored data block to the checksum corresponding to the first data integrity error.

37. The computer-readable medium of claim 36, wherein the contents of the computer-readable medium cause the computer system to operate the storage system by performing the further steps of:

in response to a mismatch between the restored data block and the checksum corresponding to the first data integrity error, creating a restored checksum using the restored data block to replace the checksum corresponding to the first data integrity error.

38. The computer-readable medium of claim 29, wherein the contents of the computer-readable medium cause the computer system to operate the storage system by performing the further steps of:

in response to detecting a first data integrity error in a first vertical redundant relationship, detecting a second data integrity error in a second vertical redundant relationship, and detecting no data integrity errors in the horizontal redundant relationship, reporting a data loss condition.

39. The computer-readable medium of claim 29, wherein the contents of the computer-readable medium cause the computer system to operate the storage system by performing the further steps of:

in response to detecting a first data integrity error in a first vertical redundant relationship, detecting a second data integrity error in a second vertical redundant relationship, and detecting a third data integrity error in the horizontal redundant relationship;

creating a first restored data block using the horizontal redundant relationship to replace the data block corresponding to the first vertical redundant relationship;

comparing the first restored data block to the checksum corresponding to the first vertical redundant relationship;

creating a second restored data block using the horizontal redundant relationship to replace the data block corresponding to the second vertical redundant relationship; and comparing the second restored data block to the checksum corresponding to the second vertical redundant relationship.

40. The computer-readable medium of claim 39, wherein the contents of the computer-readable medium cause the computer system to operate the storage system by performing the further steps of:

reporting a data loss condition in response to either:
(a) a mismatch between the first restored data block and the checksum corresponding to the first vertical redundant relationship and a mismatch between the second restored data block and the checksum corresponding to the second vertical redundant relationship; or
(b) a match between the first restored data block and the checksum corresponding to the first vertical redundant relationship and a match between the second restored data block and the checksum corresponding to the second vertical redundant relationship.

41. The computer-readable medium of claim 39, wherein the contents of the computer-readable medium cause the computer system to operate the storage system by performing the further steps of:

in response to a match between the first restored data block and the checksum corresponding to the first vertical redundant relationship and a mismatch between the second restored data block and the checksum corresponding to the second vertical redundant relationship, creating a restored checksum using the second restored data block to replace the checksum corresponding to the second vertical redundant relationship.

42. The computer-readable medium of claim 29, wherein the contents of the computer-readable medium cause the computer system to operate the storage system by performing the further steps of:

in response to detecting data integrity errors in at least three of the vertical redundant relationships, reporting a data loss.

43. A storage system, comprising:

a plurality of storage devices configured to store a plurality of data blocks and a plurality of checksums, wherein each data block in said plurality of data blocks has a first type of redundant relationship with a corresponding one of the plurality of checksums and each data block in said plurality of data blocks has a second type of redundant relationship with the remaining data blocks in said plurality of data blocks; and an array manager coupled to said plurality of storage devices, wherein said array manager is configured such that in response to detection of a data integrity error in at least one of the first type of redundant relationships in the plurality of data blocks, said array manager determines whether the first type of redundant relationships between each of the remaining data blocks and the corresponding checksums indicates an error;

wherein the array manager further determines whether the second type of redundant relationship between the plurality of data blocks indicates an error.

44. The storage system of claim 43, wherein:

said array manager is configured to determine whether the first type of redundant relationships between each of the remaining data blocks and the corresponding checksums indicates an error by calculating a new checksum for each of the remaining data blocks in the plurality of data blocks and comparing the calculated new checksum to the checksum from the plurality of checksums corresponding to that data block.

45. The storage system of claim 43, wherein:

each data block in the plurality of data blocks has a vertical redundant relationship with a set of corresponding checksums, and each of the checksums in the set of corresponding checksums has a horizontal checksum redundant relationship with the other checksums in the set of corresponding checksums.

46. The storage system of claim 45, wherein:

said array manager is configured such that in response to detecting a first data integrity error between a first data block and a first checksum from a first set of checksums corresponding to the first data block, said array manager reviews the redundant relationships between the first data block and the remaining checksums in the first set of checksums; and said array manager is further configured such that in response to detecting no data integrity errors between the first data block and the remaining checksums in the first set of checksums, said array manager creates a restored first checksum to replace the first checksum corresponding to the first data integrity error.

47. The storage system of claim 43, wherein:

said plurality of data blocks comprises a plurality of data stripe units and a parity stripe unit; and said array manager is configured to determine whether the second type of redundant relationship between the plurality of data blocks indicates an error by calculating a new parity stripe unit based on the plurality of data stripe units and comparing the calculated new parity stripe unit to the parity stripe unit from the plurality of data blocks.

48. The storage system of claim 43, wherein:

said plurality of data blocks comprises a first mirrored data block and a corresponding second mirrored data block; and said array manager is configured to determine whether the second type of redundant relationship between the plurality of data blocks indicates an error by comparing the first mirrored data block and the second mirrored data block.

49. The storage system of claim 43, wherein:

said array manager is configured such that in response to detecting a first data integrity error in exactly one of the first type of redundant relationships and detecting no data integrity errors in the second type of redundant relationship, said array manager creates a restored checksum using the data block corresponding to the first data integrity error to replace the existing checksum corresponding to the first data integrity error.

50. The storage system of claim 43, wherein:

said array manager is configured such that in response to detecting a first data integrity error in exactly one of the first type of redundant relationships and detecting a second data integrity error in the second type of redundant relationship, said array manager creates a restored data block using the second type of redundant relationship to replace the data block corresponding to the first data integrity error and compares the restored data block to the checksum corresponding to the first data integrity error.

51. The storage system of claim 50, wherein:

said array manager is configured such that in response to a mismatch between the restored data block and the checksum corresponding to the first data integrity error, said array manager creates a restored checksum using the restored data block to replace the checksum corresponding to the first data integrity error.

52. The storage system of claim 43, further comprising:

said array manager is configured such that in response to detecting a first data integrity error in a first one of the first type of redundant relationship, detecting a second data integrity error in a second one of the first type of redundant relationship, and detecting no data integrity errors in the second type of redundant relationship, said array manager reports a data loss condition.

53. The storage system of claim 43, wherein:

said array manager is configured such that in response to detecting a first data integrity error in a first one of the first type of redundant relationship, detecting a second data integrity error in a second one of the first type of redundant relationship, and detecting a third data integrity error in the second type of redundant relationship, said array manager:
- creates a first restored data block using the second type of redundant relationship to replace the data block corresponding to the first one of the first type of redundant relationship;
- compares the first restored data block to the checksum corresponding to the first one of the first type of redundant relationship;
- creates a second restored data block using the second type of redundant relationship to replace the data block corresponding to the second one of the first type of redundant relationship; and
- compares the second restored data block to the checksum corresponding to the second one of the first type of redundant relationship.

54. The storage system of claim 53, wherein:

said array manager is configured such that said array manager reports a data loss condition in response to either:
- (a) a mismatch between the first restored data block and the checksum corresponding to the first one of the first type of redundant relationship and a mismatch between the second restored data block and the checksum corresponding to the second one of the first type of redundant relationship;
- (b) a match between the first restored data block and the checksum corresponding to the first one of the first type of redundant relationship and a match between the second restored data block and the checksum corresponding to the second one of the first type of redundant relationship.

55. The storage system of claim 53, wherein:

said array manager is configured such that in response to a match between the first restored data block and the checksum corresponding to the first one of the first type of redundant relationship and a mismatch between the second restored data block and the checksum corresponding to the second one of the first type of redundant relationship, said array manager creates a restored checksum using the second restored data block to replace the checksum corresponding to the second one of the first type of redundant relationship.

56. The storage system of claim 43, wherein:

said array manager is configured to report a data loss condition in response to detecting data integrity errors in at least three of the first type of redundant relationships.

* * * * *